(12) United States Patent
Carnes et al.

(10) Patent No.: US 7,914,878 B2
(45) Date of Patent: Mar. 29, 2011

(54) GROOVED, CORNER-READY WALL BASE

(75) Inventors: Craig Allen Carnes, Tracy, CA (US); Robert Francis Pitman, Burlingame, CA (US)

(73) Assignee: Burke Industries Inc., San Jose, CA (US)

( * ) Notice: Subject to any disclaimer, the term of this patent is extended or adjusted under 35 U.S.C. 154(b) by 69 days.

(21) Appl. No.: 11/867,680

(22) Filed: Oct. 4, 2007

(65) Prior Publication Data

US 2009/0092790 A1 Apr. 9, 2009

(51) Int. Cl.
*B32B 3/30* (2006.01)
*E04B 2/00* (2006.01)

(52) U.S. Cl. ..... 428/167; 428/172; 52/287.1; 52/717.03

(58) Field of Classification Search .......... 52/287.1, 52/288.1, 717.03, 275; 428/81, 130, 167, 428/172, 192
See application file for complete search history.

(56) References Cited

U.S. PATENT DOCUMENTS

| | | | |
|---|---|---|---|
| 3,475,871 A | 11/1969 | Saunders | |
| 3,638,374 A | 2/1972 | Harby | |
| 4,214,414 A | 7/1980 | Wendt | |
| 4,225,496 A | 9/1980 | Columbus | |
| 4,516,452 A | 5/1985 | Dahle | |
| 4,570,350 A | 2/1986 | Cullison | |
| 5,184,445 A | 2/1993 | Hoopengardner | |
| 5,212,923 A | 5/1993 | Pelosi | |
| D355,264 S | 2/1995 | Stoler | |
| 5,450,698 A | 9/1995 | Hoopengardner | |
| 5,522,296 A | 6/1996 | Stoler | |
| D371,609 S | 7/1996 | Pelosi | |
| D372,546 S | 8/1996 | Pelosi | |
| 5,553,431 A | 9/1996 | Pelosi, Jr. | |
| 5,595,041 A | 1/1997 | Hoopengardner | |
| D392,055 S | 3/1998 | Pelosi | |
| 5,971,453 A | 10/1999 | Schlisner | |
| D416,632 S | 11/1999 | Pelosi, Jr. | |
| D424,709 S | 5/2000 | Minidis | |
| 6,122,872 A | 9/2000 | Sauter | |
| 6,189,275 B1 | 2/2001 | Schlisner | |
| 6,195,957 B1 | 3/2001 | Schlisner | |
| 6,237,459 B1 | 5/2001 | Brown | |
| 6,279,279 B1 * | 8/2001 | Larimore | 52/302.1 |
| D447,579 S | 9/2001 | Lehrkamp | |
| D448,860 S | 10/2001 | Whitson | |
| 6,357,189 B2 | 3/2002 | Schlisner | |
| 6,406,509 B1 | 6/2002 | Duffy | |

(Continued)

OTHER PUBLICATIONS

Roppe, Installation Instructions Pinnacle Rubber Base, 2002 (no month), accessed at www.sstfloor.com/files/ts1_6.pdf, accessed Oct. 14, 2009.*

(Continued)

*Primary Examiner* — Donald Loney
(74) *Attorney, Agent, or Firm* — Law Offices of James R. Cypher; Charles R. Cypher

(57) ABSTRACT

A resilient wall base member manufactured with pre-scored grooves to allow relatively short, straight lengths to be used for both flat walls and wall corner junctures without on site scoring operations or equipment. The lengths can either be pre-cut during manufacturing to convenient lengths or can be cut after manufacturing from coils.

7 Claims, 13 Drawing Sheets

U.S. PATENT DOCUMENTS

| | | |
|---|---|---|
| D474,548 S | 5/2003 | Glatz |
| D481,137 S | 10/2003 | Glatz |
| D483,881 S | 12/2003 | Glatz |
| D483,882 S | 12/2003 | Glatz |
| D483,883 S | 12/2003 | Glatz |
| D483,884 S | 12/2003 | Glatz |
| D484,253 S | 12/2003 | Glatz |
| D484,254 S | 12/2003 | Glatz |
| D489,831 S | 5/2004 | Glatz |
| D493,895 S | 8/2004 | Glatz |
| D499,192 S | 11/2004 | Glatz |
| D499,193 S | 11/2004 | Glatz |
| D499,818 S | 12/2004 | Glatz |
| D500,149 S | 12/2004 | Glatz |
| D500,371 S | 12/2004 | Glatz |
| D500,869 S | 1/2005 | Glatz |
| D510,145 S | 9/2005 | Folliard |
| D511,216 S | 11/2005 | Folliard |
| D514,236 S | 1/2006 | Glatz |
| D517,223 S | 3/2006 | Folliard |
| D529,196 S | 9/2006 | Folliard |
| D529,197 S | 9/2006 | Folliard |
| D529,198 S | 9/2006 | Folliard |
| D529,199 S | 9/2006 | Folliard |
| D529,631 S | 10/2006 | Folliard |
| D529,632 S | 10/2006 | Folliard |
| 7,556,758 B2 | 7/2009 | Johnston |
| 2001/0009086 A1 | 7/2001 | Schlisner |
| 2005/0055936 A1 | 3/2005 | Murphy |
| 2005/0221064 A1 | 10/2005 | Glatz |
| 2006/0107607 A1 | 5/2006 | Dillon |
| 2006/0130413 A1* | 6/2006 | Valentine ............ 52/287.1 |
| 2006/0156685 A1 | 7/2006 | Shank |
| 2007/0006545 A1 | 1/2007 | Johnston |
| 2008/0005986 A1 | 1/2008 | Thompson |
| 2008/0236072 A1 | 10/2008 | Johnston |

OTHER PUBLICATIONS

VPI, Installation and maintenance Instructions Wall Base, 2001 (no month) accessed at www.vpicorp.com/downloads/wallbase_install. pdf, accessed Oct. 14, 2009.*

Johnsonite, Rubber & Vinyl Wall Base, Installation and Maintenance Instructions, Jan. 2001, pp. 1-4 of 4, Revision 5, Chagrin Falls, OH.

Burke Flooring, Vinyl or Rubber Cove Case, Handling Instructions, Mar. 2002, p. 1 of 1, United States.

* cited by examiner

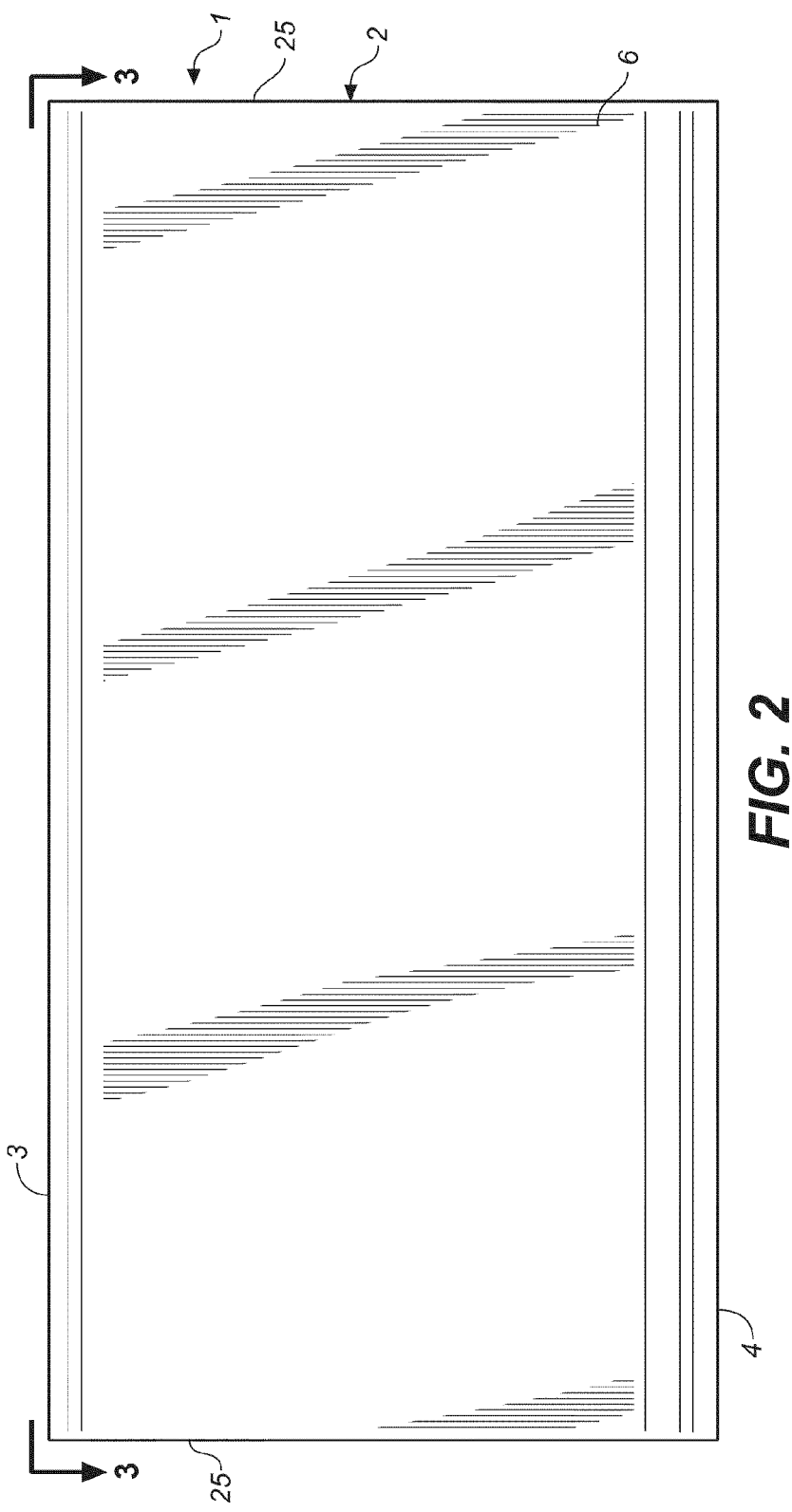
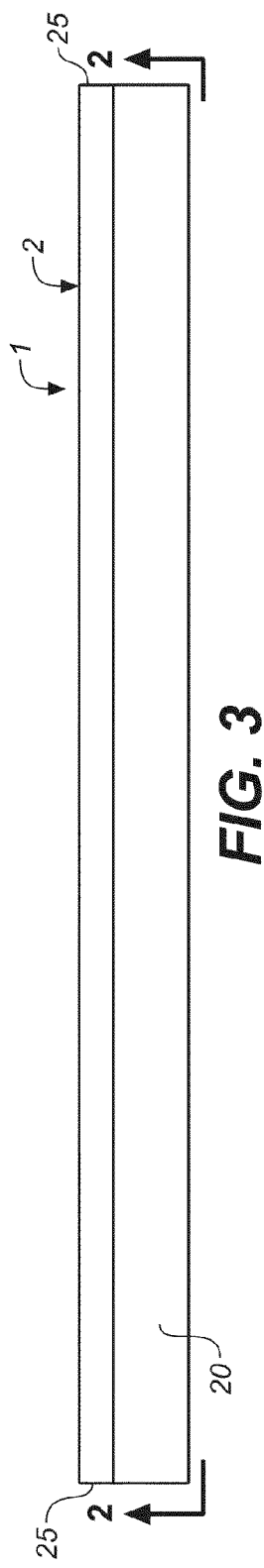
FIG. 2
FIG. 3

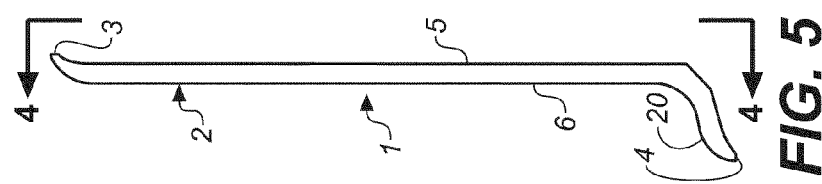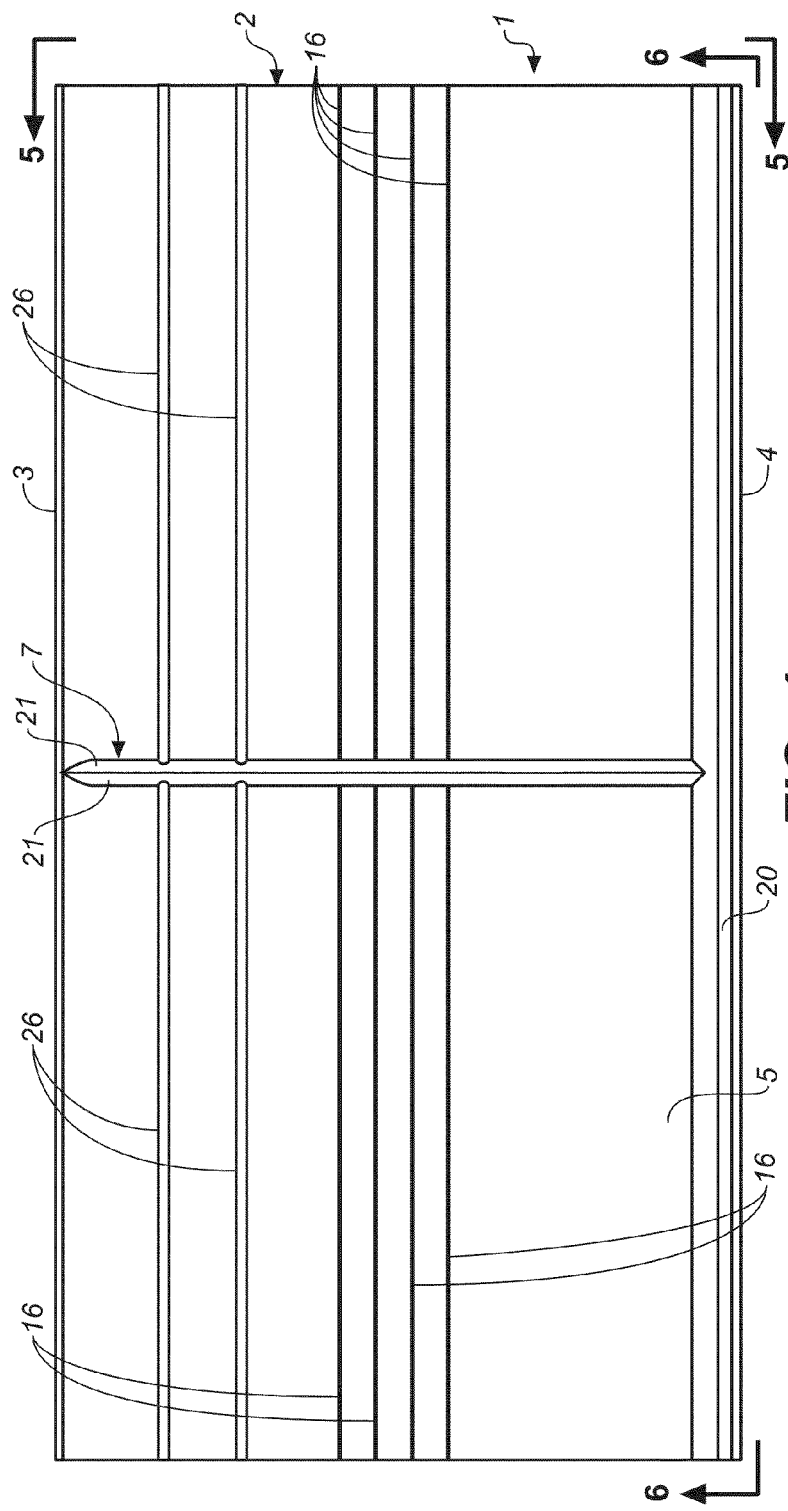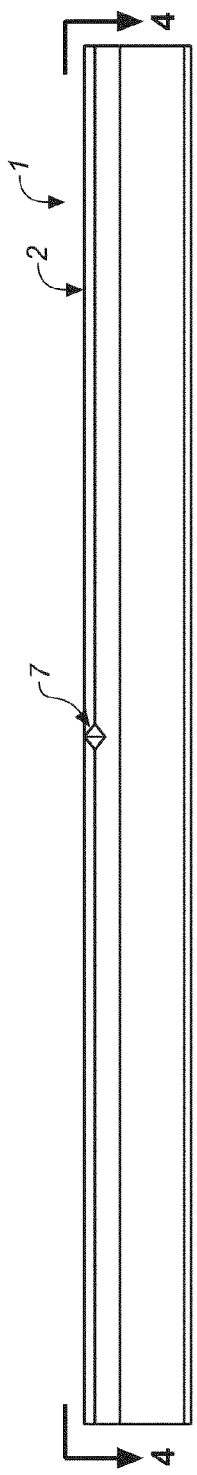
FIG. 5
FIG. 4
FIG. 6

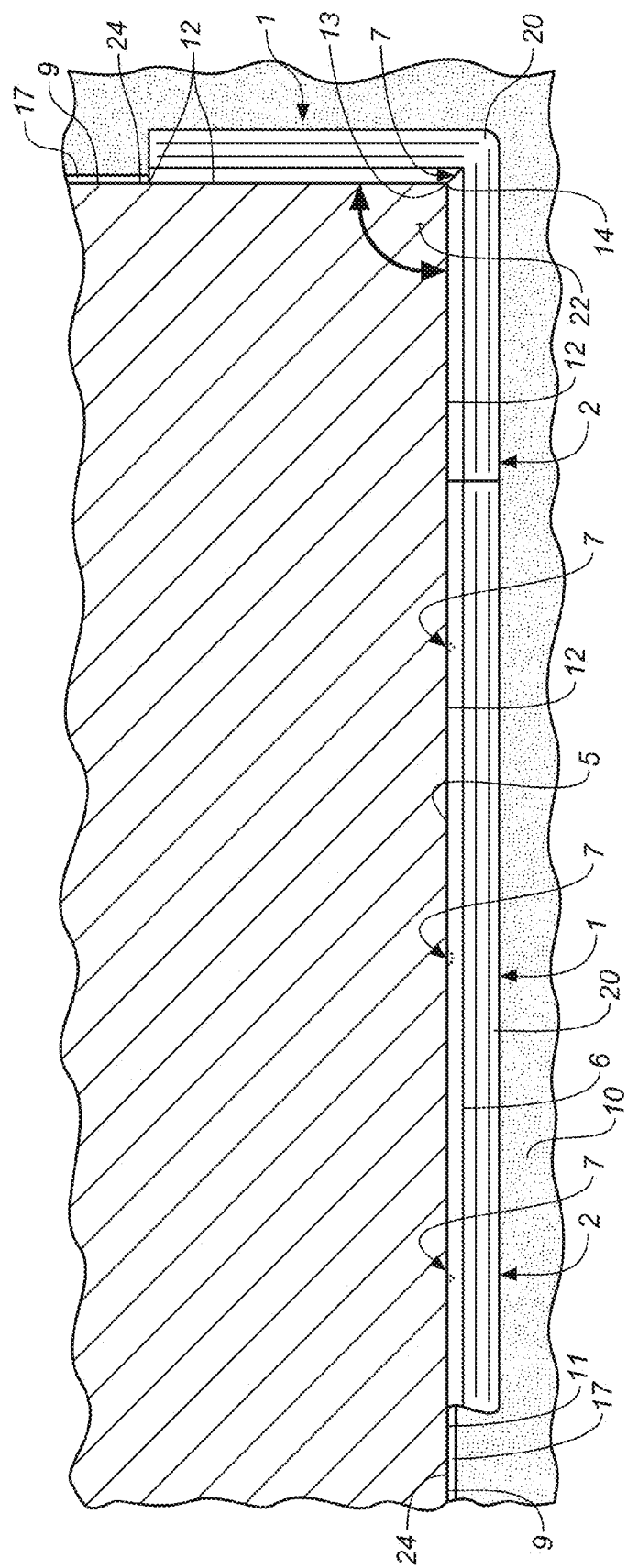

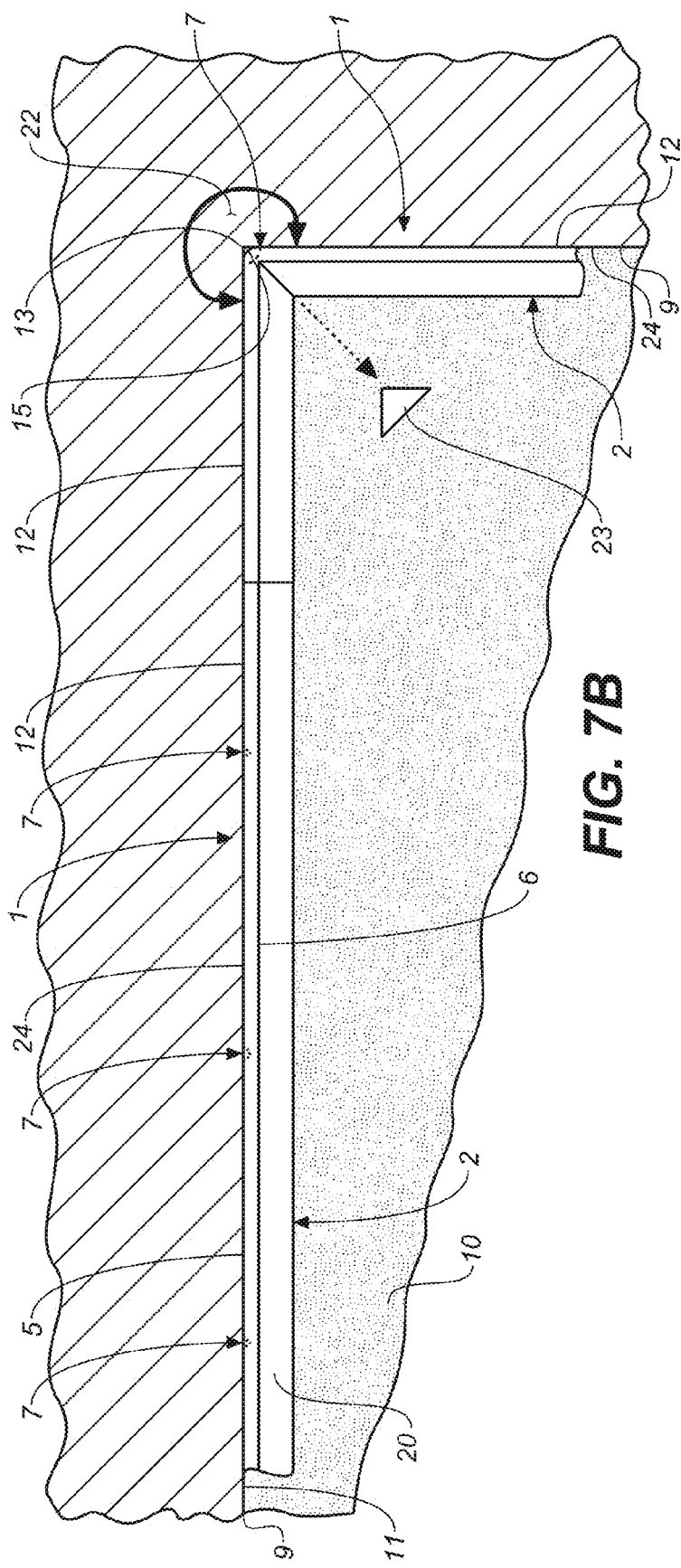
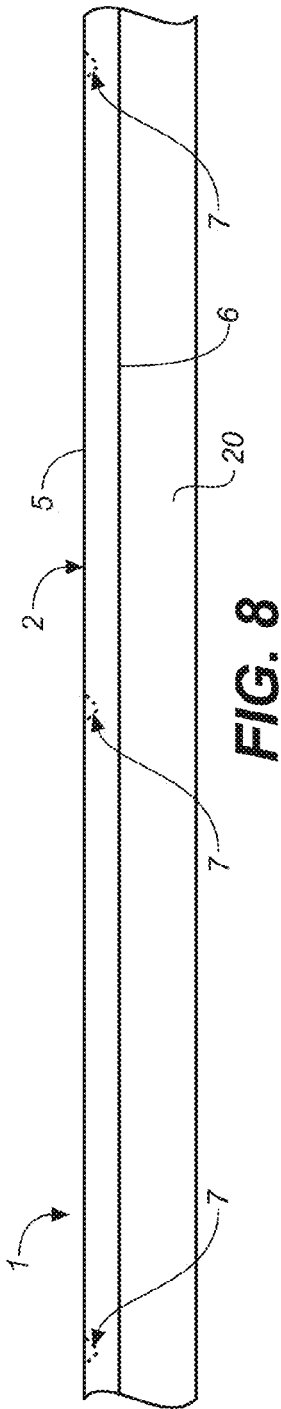
FIG. 7B
FIG. 8

US 7,914,878 B2

GROOVED, CORNER-READY WALL BASE

BACKGROUND OF THE INVENTION

This invention relates to resilient wall base, specifically to resilient wall base members manufactured with pre-scored grooves to allow relatively short, straight lengths to be used for both flat walls and wall corner junctures without on site scoring operations or equipment. The lengths can either be pre-cut during manufacturing to convenient lengths or can be cut after manufacturing from coils.

Resilient wall base is a low-cost product that hides otherwise unsightly intersections between walls and floors and protects the lower wall surface from vacuums and other cleaning equipment. Resilient wall base has been manufactured in both relatively short lengths, flat and stacked for transport, and relatively long coiled lengths. Various types of thermoplastic and thermoset compounds are employed as base materials in the manufacture of resilient wall base. Resilient wall base is preferable to rigid materials, such as wood or composites, because of its flexibility. This flexibility allows the resilient wall base to be closely fit to irregular wall surfaces and can be taken advantage of to "wrap" corners with the product.

Straight wall sections are covered by simply gluing the resilient wall base to the wall. With conventional resilient wall base, both inside and outside corners of a room require either additional preparation of the material or the use of manufactured L-shaped corner sections. The straight resilient wall base will not "wrap" flush around a 90-degree wall juncture because of the stiffness and thickness of the resilient wall base material.

The L-shaped corner section is the only commercially-produced solution. Corner sections allow the installer to place a manufactured 90-degree corner piece and simply join straight sections of resilient wall base to each end. Corners sections are typically molded (in the case of thermoset material) or heated and formed (in the case of thermoplastic material). Corner sections are typically sold and packaged separately from each other and from the straight wall sections or coiled lengths of resilient wall base. Corner sections are several times more expensive per foot than the straight wall sections used for the rest of the walls. The corner sections and straight wall section may also be mismatched in both cross-sectional thickness and color because they may not have been made from the same production batch of material.

A more common practice is to use the straight wall sections to make corners on site in the field. There are two common methods. The first requires heat forming equipment designed for the purpose of making corner sections, which in turn requires a substantial investment in the equipment. This method is inherently inefficient due to the necessity of adjusting the equipment depending on the type of material being used. This method does not work well with thermoset compounds because thermoset compounds do not soften substantially when heated.

The most common method of producing a corner section on site is to cut away a portion of the material from the inner face, or back, of the straight wall section with a knife or specialized scoring tool. This requires practice and skill and additional time to complete. If the groove is cut too shallow, the resilient wall base will not be flush at the corner wall juncture. If the groove is cut too deep, the material can separate before installation or after, resulting in an imperfect corner, a wasted length of resilient wall base, or both.

SUMMARY OF THE INVENTION

A first advantage of the present invention is to provide a wall base member that saves the cost of pre-manufactured corners.

A second advantage of the present invention is to provide a wall base member where every length can be used as a straight section, corner section or, effectively, both.

A third advantage of the present invention is that the pre-scored grooves are made in a controlled manufacturing environment and are not, therefore, subject to the same variations as on-site scoring, which can result in grooves that are either too shallow or too deep. Grooves that are too shallow result in ill-fitting corner sections, while grooves that are too deep can crack over time. On-site scoring mistakes can also result in simply cutting through the wall base member.

A fourth advantage of the present invention is that it saves installation time and, therefore, cost by eliminating on-site scoring.

A fifth advantage of the present invention is that corner sections can be guaranteed to match straight sections in profile and color because corner sections and straight sections are one and the same.

A sixth advantage of the present invention is that no pre-planning of corners is required before purchasing wall base materials.

DRAWING FIGURES

FIG. 2 is a front elevation view of a wall base member of the present invention.

FIG. 3 is a top plan view of a wall base member of the present invention.

FIG. 4 is a back elevation view of a wall base member of the present invention.

FIG. 5 is a side elevation view of a wall base member of the present invention.

FIG. 6 is a bottom plan view of a wall base member of the present invention.

FIG. 7A is a top plan view of a wall base member of the present invention applied to a convex 90-degree corner between two portion of a wall and an adjacent wall base member of the present invention applied to a flat portion of a wall, the adjacent wall base member showing pre-scored grooves with flat side and with curved sides.

FIG. 7B is a top plan view of a wall base member of the present invention applied to a concave 90-degree corner between two portion of a wall and an adjacent wall base member of the present invention applied to a flat portion of a wall, the adjacent wall base member showing pre-scored grooves with flat side and with curved sides.

FIG. 8 is a top plan view of a section of a wall base member of the present invention.

DETAILED DESCRIPTION OF THE INVENTION

Figure 1A:
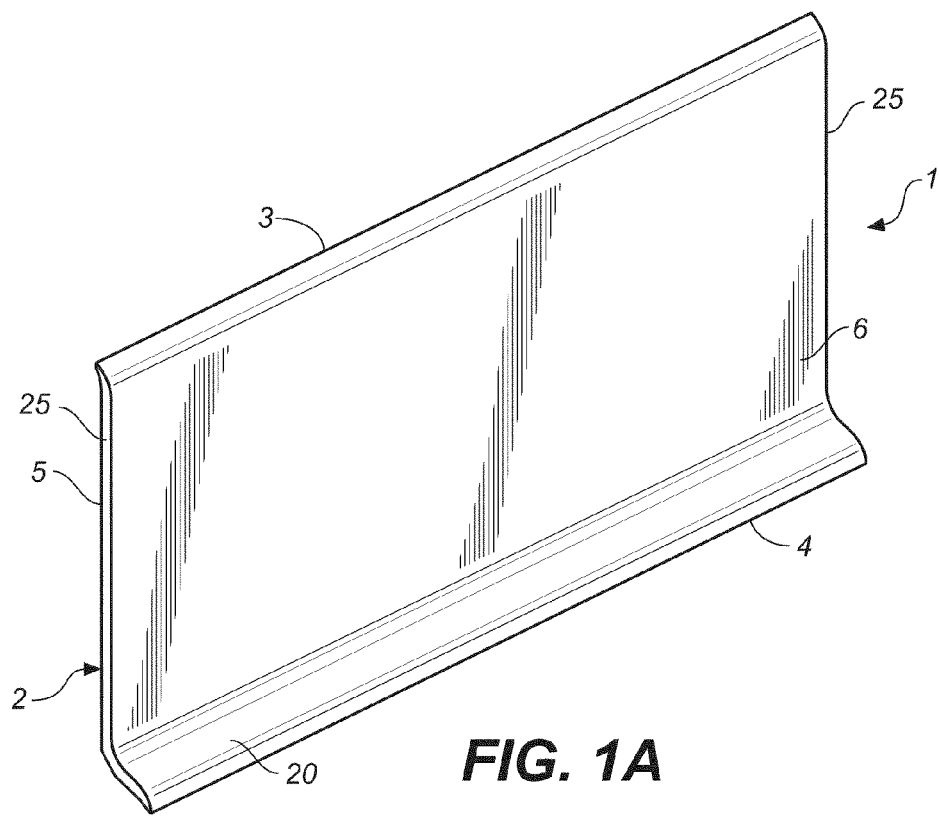
FIG. 1A is an outside perspective view of a wall base member of the present invention.
Figure 1B:
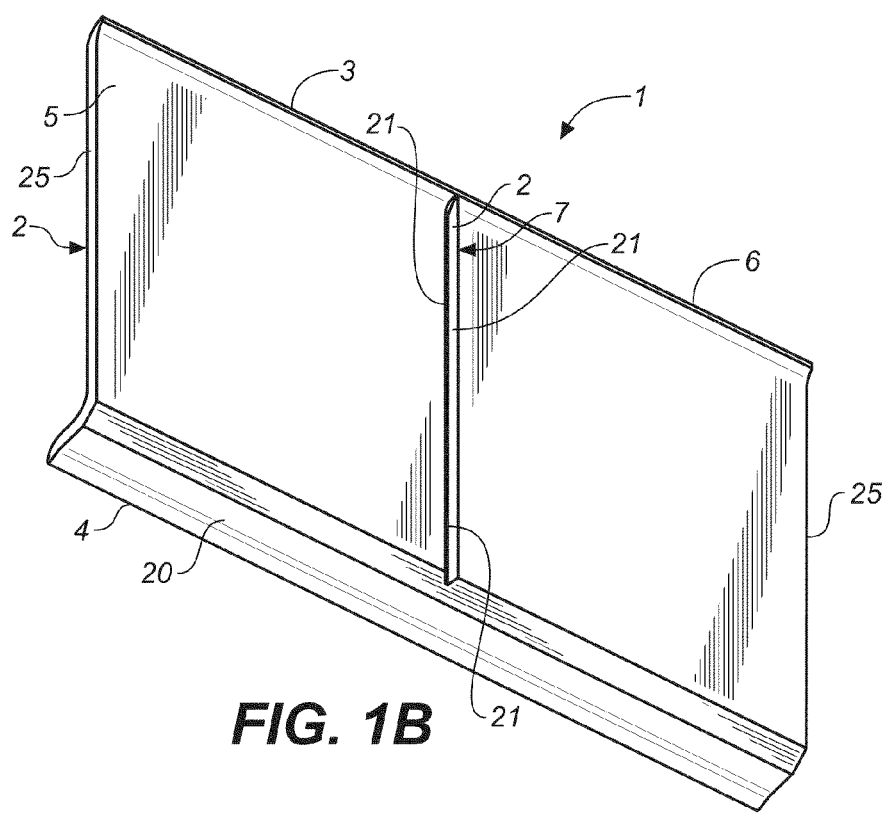
FIG. 1B is an inside perspective view of a wall base member of the present invention.
Figure 9:
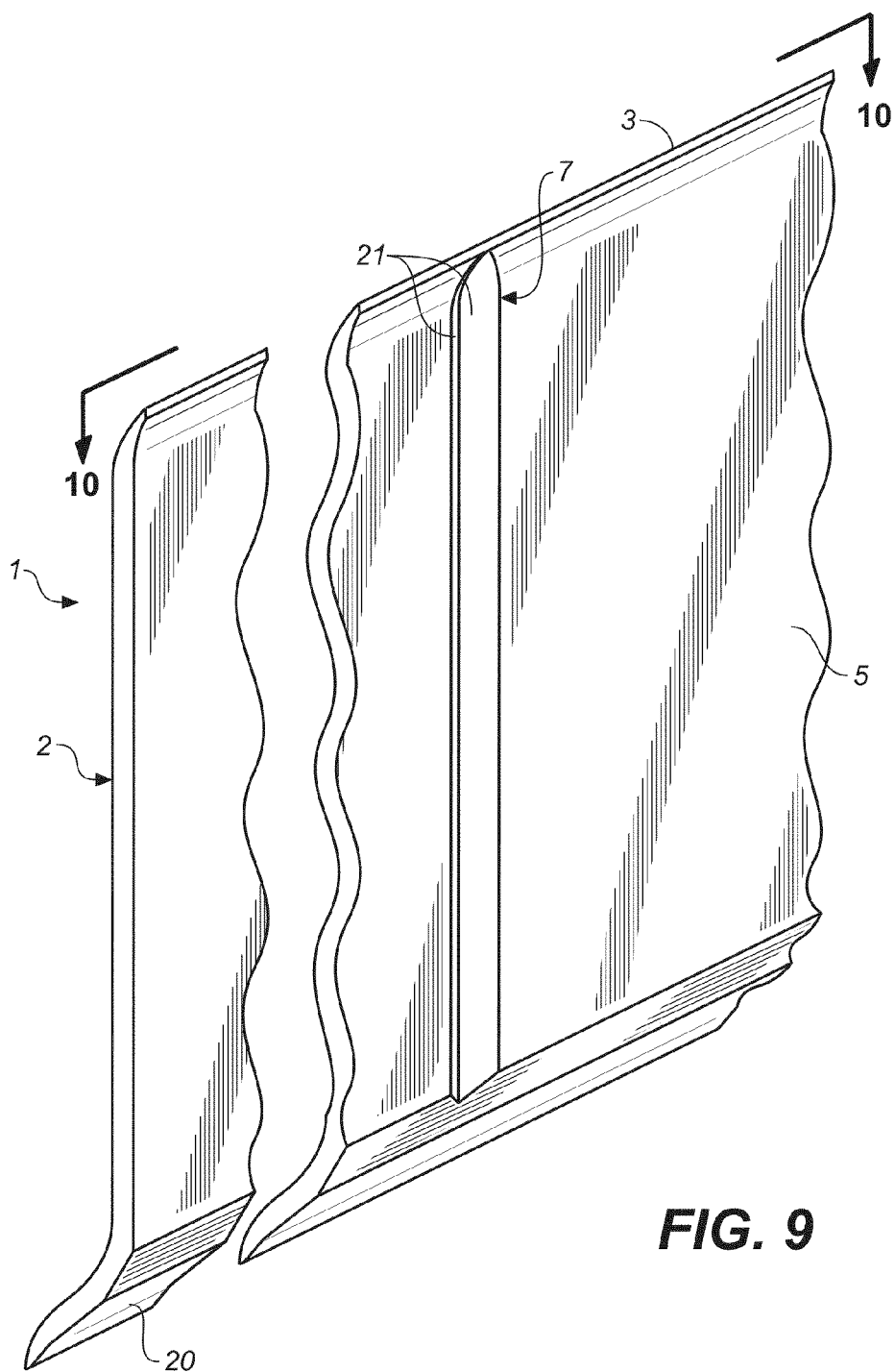
FIG. 9 is a back perspective view of a section of a wall base member of the present invention.
Figure 10:
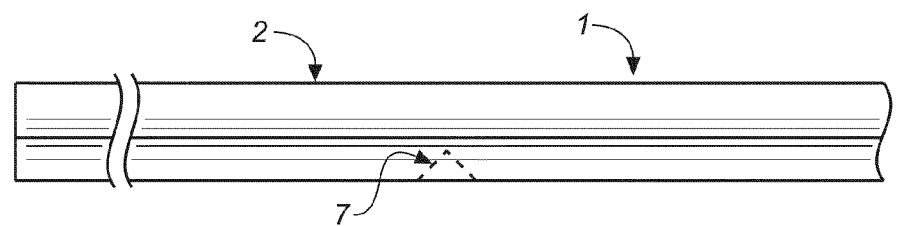
FIG. 10 is a top elevation view of the section of a wall base member of the present invention.
Figure 11A:
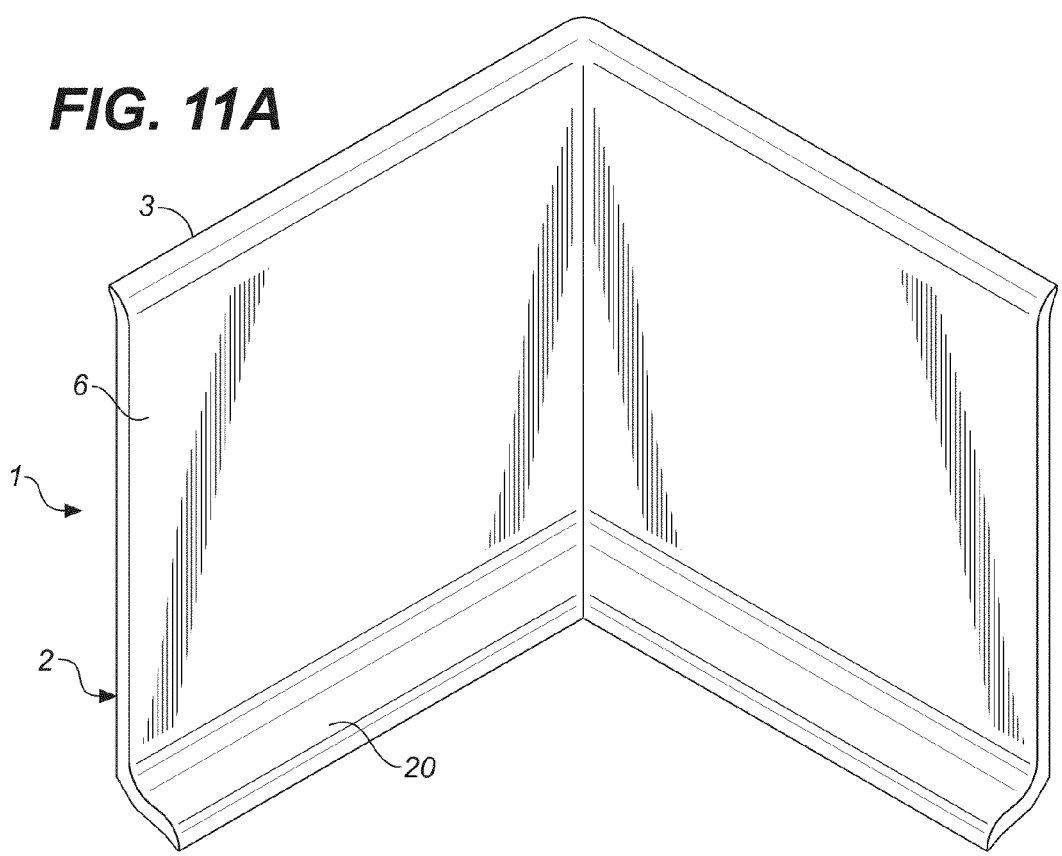
FIG. 11A is a front perspective view of a wall base member of the present invention, bent at the pre-scored groove to a 270-degree angle between adjacent portions of the inner face.
Figure 11B:
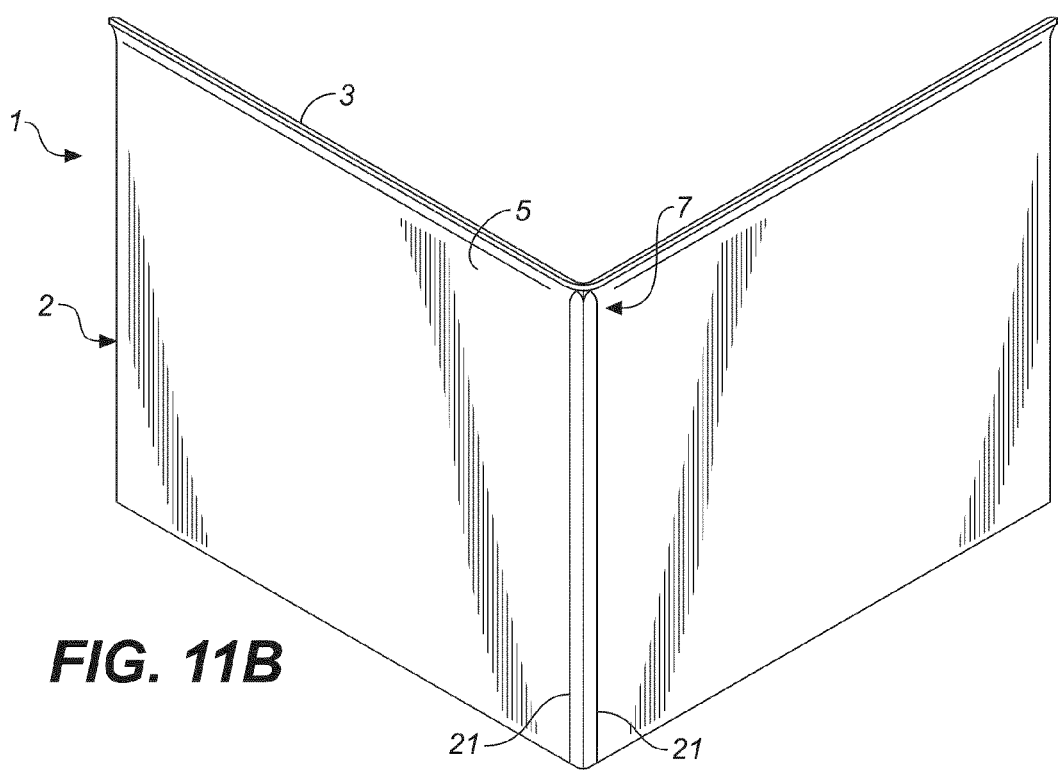
FIG. 11B is a back perspective view of a wall base member of the present invention, bent at the pre-scored groove to a 270-degree angle between adjacent portions of the inner face.
Figure 12:
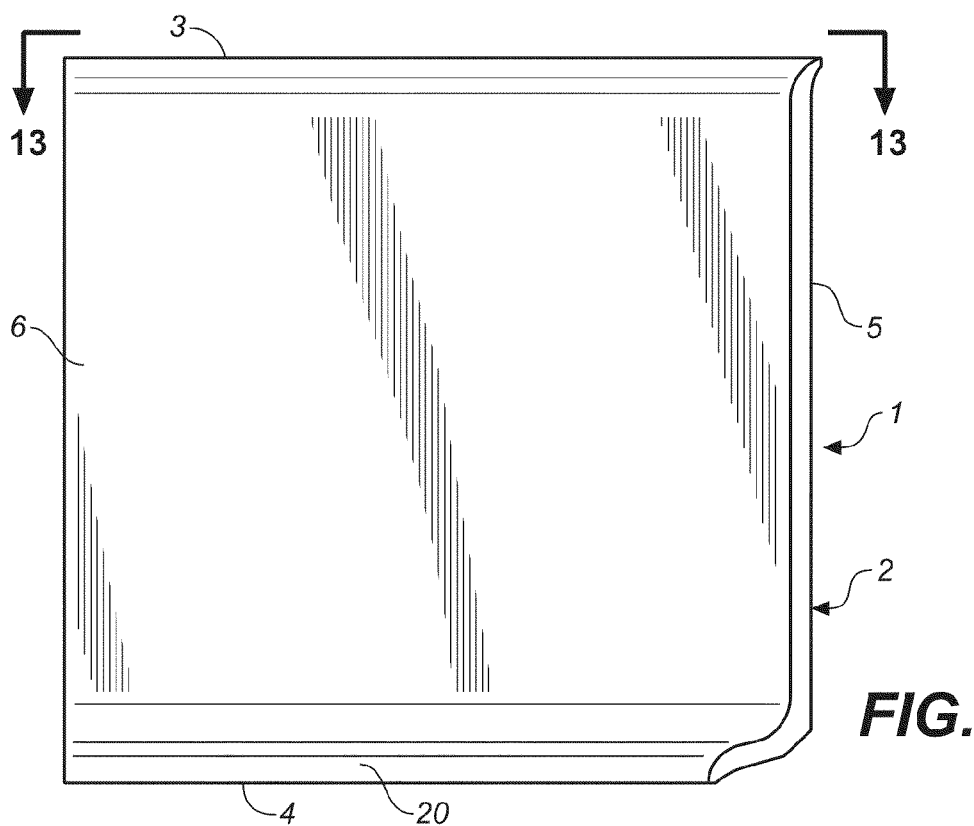
FIG. 12 is a front and side elevation view of a wall base member of the present invention, bent at the pre-scored groove to a 270-degree angle between adjacent portions of the inner face.
Figure 13:
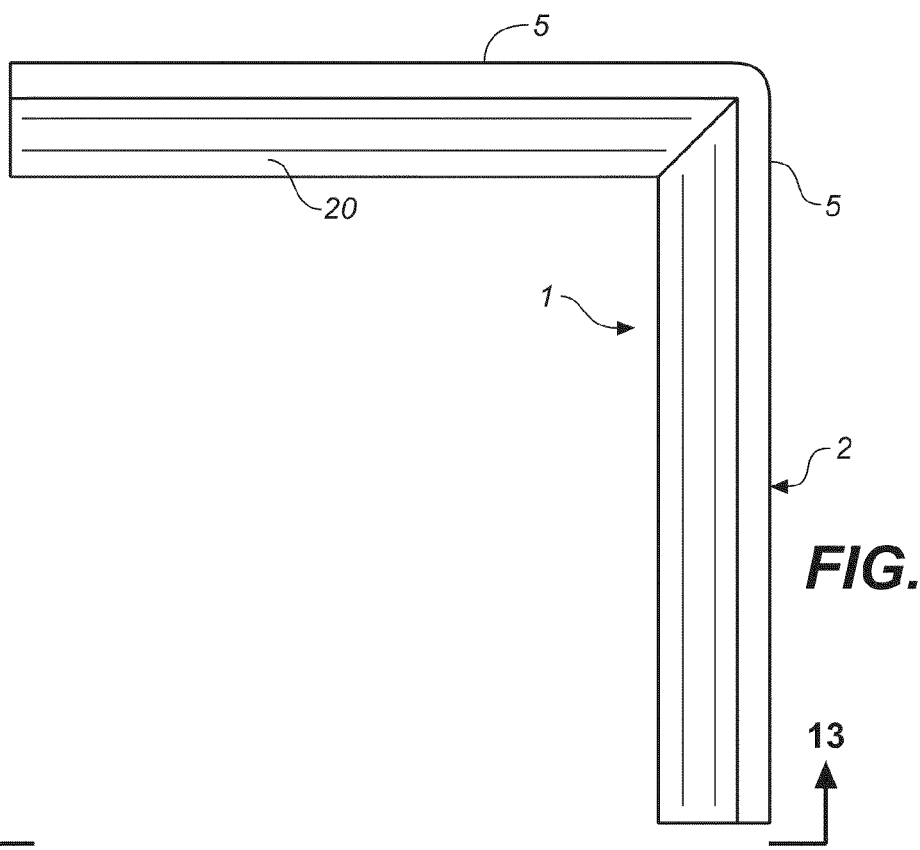
FIG. 13 is a top plan view of a wall base member of the present invention, bent at the pre-scored groove to a 270-degree angle between adjacent portions of the inner face.
Figure 14:
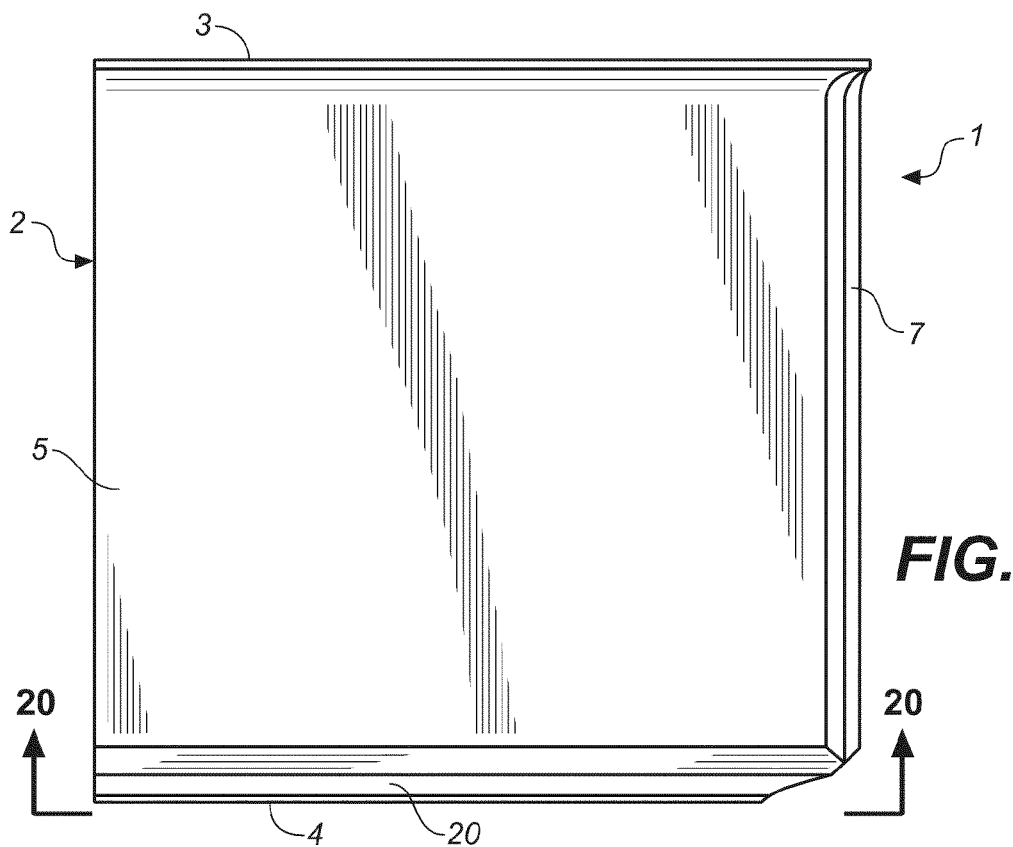
FIG. 14 is a back and side elevation view of a wall base member of the present invention, bent at the pre-scored groove to a 270-degree angle between adjacent portions of the inner face.
Figure 15:
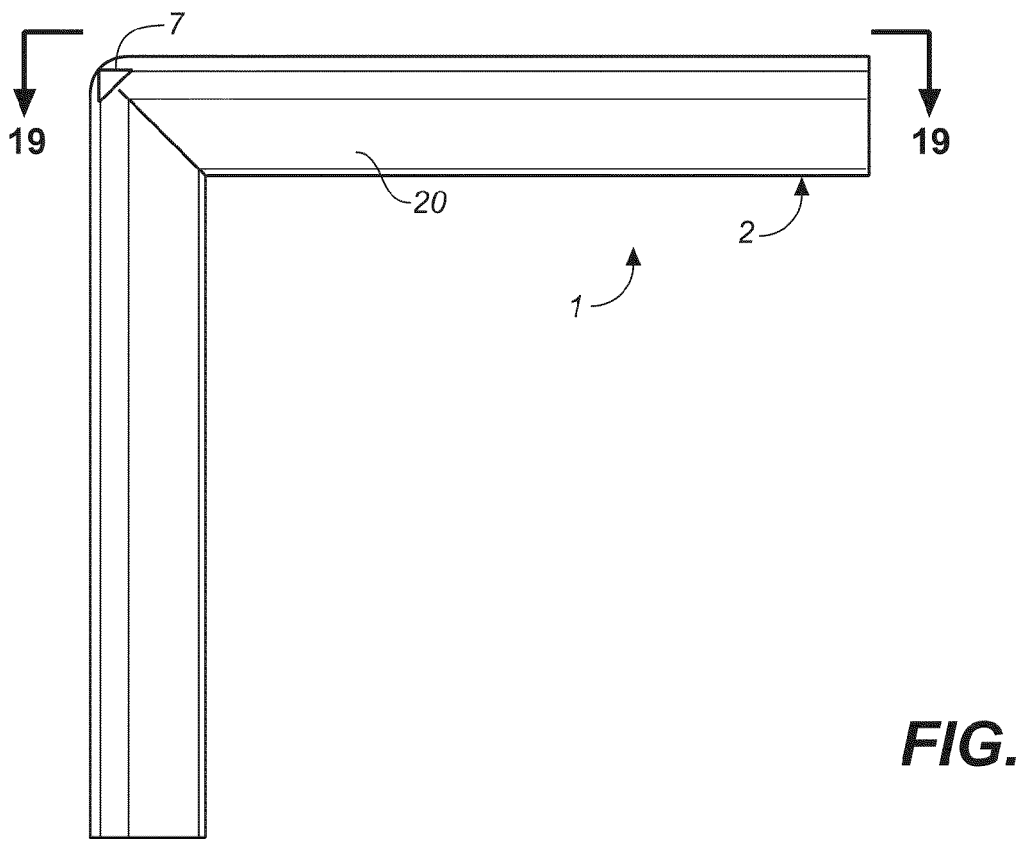
FIG. 15 is a bottom plan view of a wall base member of the present invention, bent at the pre-scored groove to a 270-degree angle between adjacent portions of the inner face.
Figure 16A:
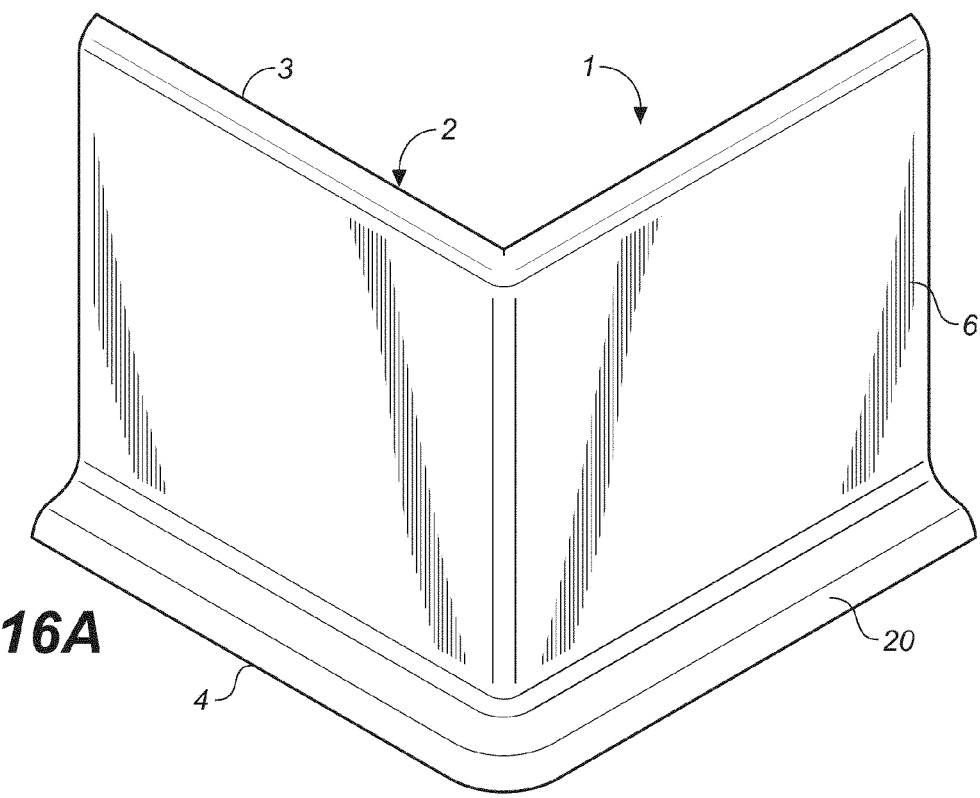
FIG. 16A is a front perspective view of a wall base member of the present invention, bent at the pre-scored groove to a 90-degree angle between adjacent portions of the inner face.
Figure 16B:
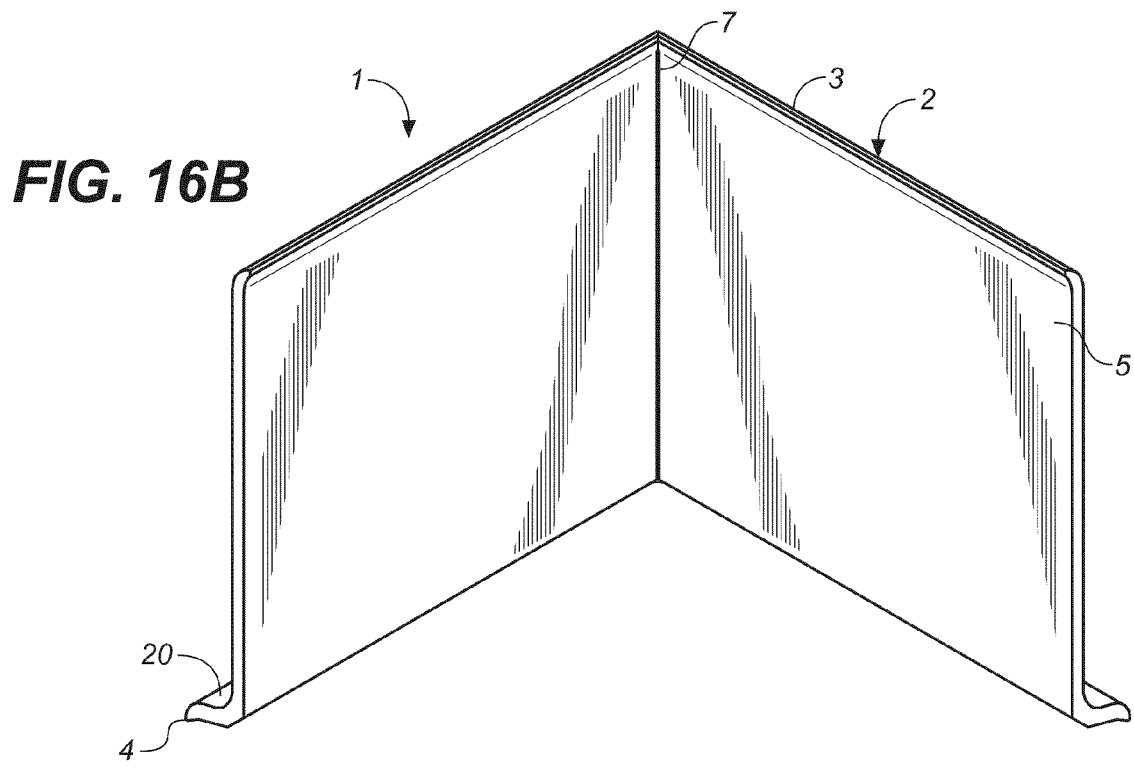
FIG. 16B is a back perspective view of a wall base member of the present invention, bent at the pre-scored groove to a 90-degree angle between adjacent portions of the inner face.
Figure 17:
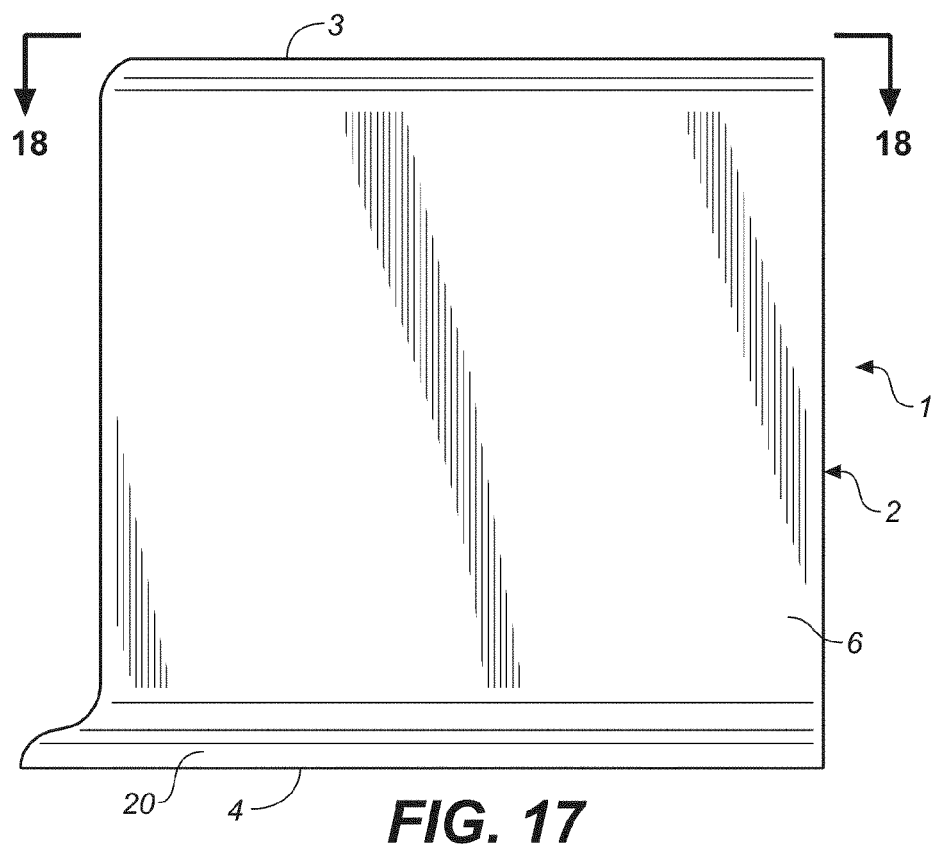
FIG. 17 is a front and side elevation view of a wall base member of the present invention, bent at the pre-scored groove to a 90-degree angle between adjacent portions of the inner face.
Figure 18:
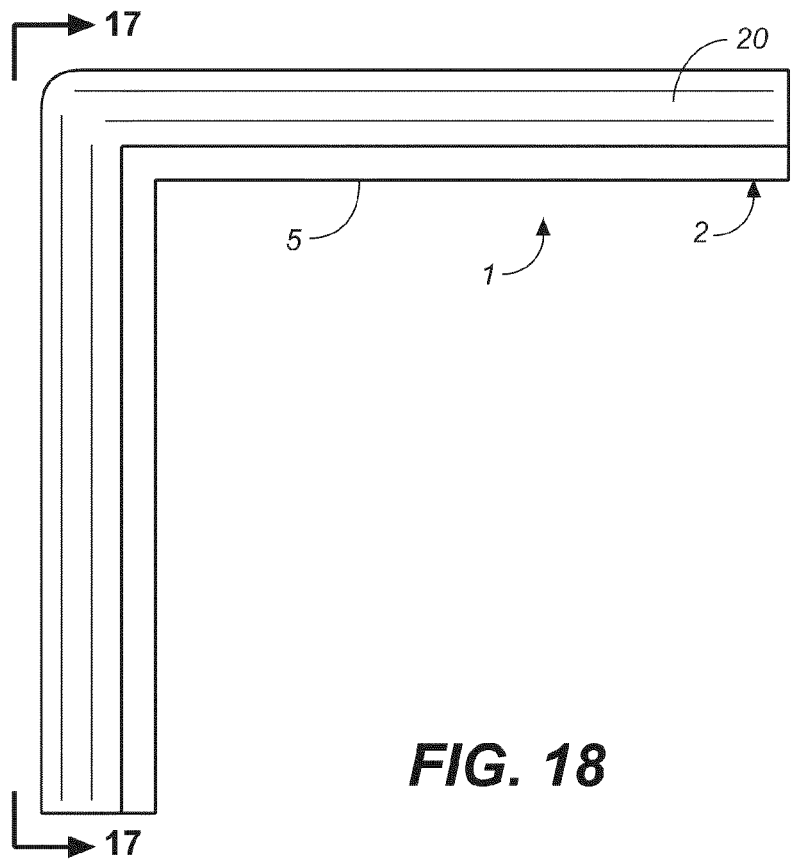
FIG. 18 is a top plan view of a wall base member of the present invention, bent at the pre-scored groove to a 90-degree angle between adjacent portions of the inner face.
Figure 19:
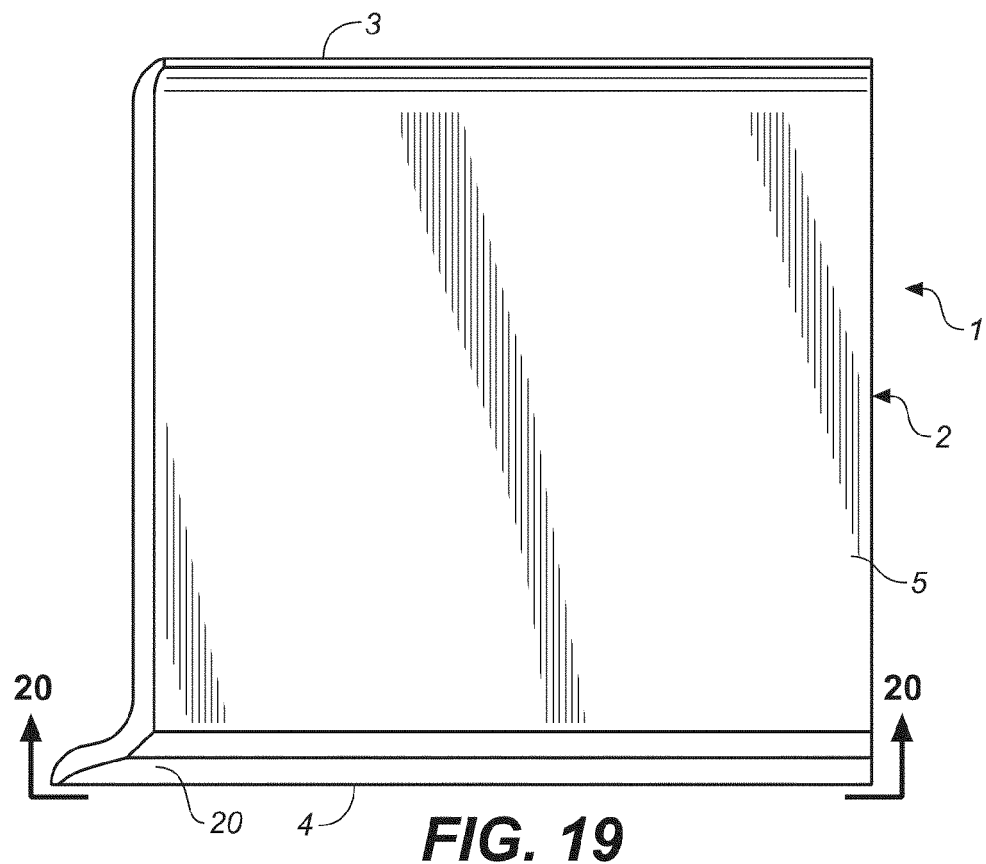
FIG. 19 is a back and side elevation view of a wall base member of the present invention, bent at the pre-scored groove to a 90-degree angle between adjacent portions of the inner face.
Figure 20:
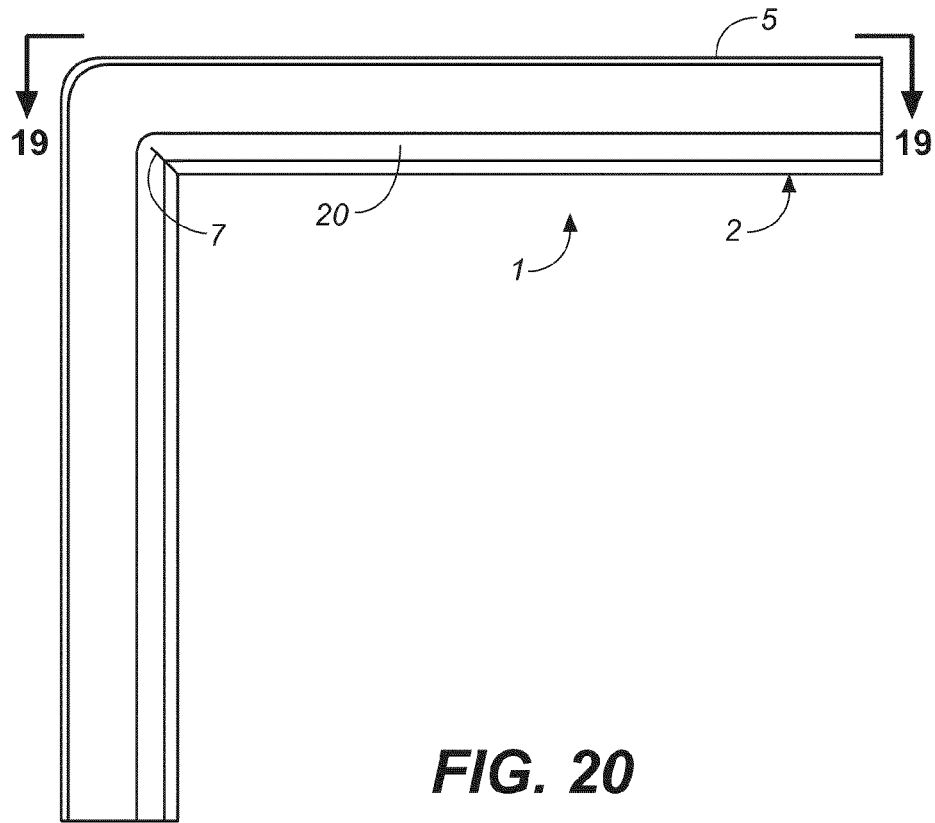
FIG. 20 is a bottom plan view of a wall base member of the present invention, bent at the pre-scored groove to a 270-degree angle between adjacent portions of the inner face.
Figure 21:
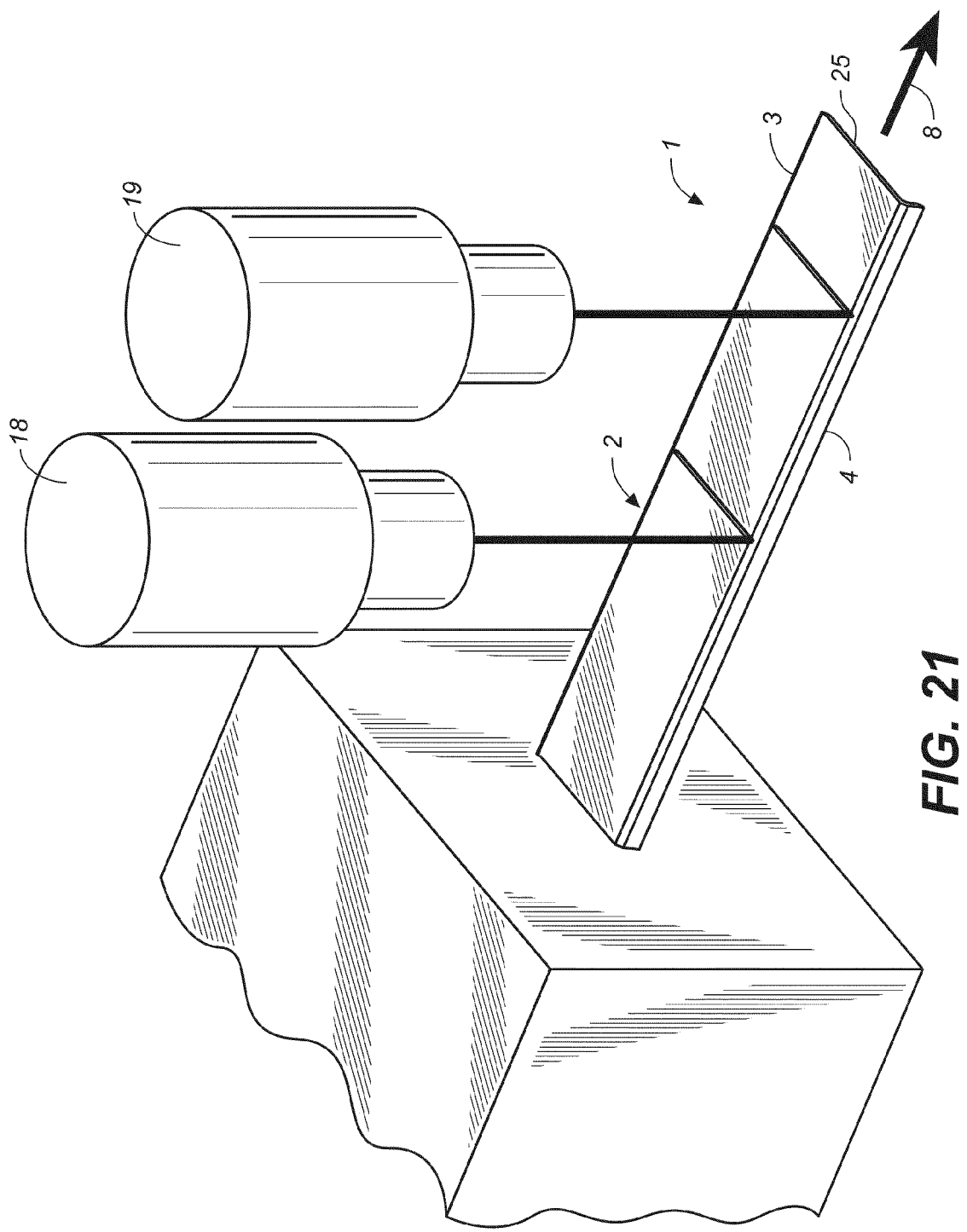
FIG. 21 is a perspective view of a wall base member of the present invention being extruded along an extrusion vector, and pre-scored by both a router and an endmill.

At its most basic, the present invention is a wall base member 1 comprising an elongated, flexible strip 2 having a top edge 3 and a bottom edge 4, an inner face 5 and an outer face 6, and a pre-scored groove 7 in the inner face 5. The pre-scored groove 7 runs between and is substantially perpendicular to the top edge 3 and the bottom edge 4. The top edge 3 and the bottom edge 4 are substantially parallel. The strip 2 can be laid substantially flat on the inner face 5. The top and bottom edges 3 and 4 are preferably straight and parallel to each other. The strip 2 preferably also has a pair of end edges 25 that are straight and parallel to each other. Preferably, the end edges 25 are substantially shorter than the top and bottom edges 3 and 4, and are substantially orthogonal to the top and bottom edges 3 and 4. The inner face 5 of the strip 2 is the side that is placed against the wall 9 to which the wall base member 1 is attached. The outer face 6 is the opposite side.

The pre-scored groove 7 preferably contacts no more than one of the top edge 3 and the bottom edge 4. Most preferably, the pre-scored groove 7 contacts neither the top edge 3 nor the bottom edge 4.

Preferably, the inner face 5 is formed with a plurality of elongated raised ribs 16 that are between and substantially parallel to the top edge 3 and the bottom edge 4. These ribs 16 are preferably less than a millimeter in height and width and run the full length of the strip 2. Their primary purpose is to increase the surface area to which adhesives can bond, thereby increasing the strength of the attachment of the strip 2.

The bottom edge 4 is preferably turned outward and downward in a compound curve so that the outer face 6 projects along the bottom edge 4 and faces upward to form a toe 20. The toe 2 increases the size of the gap between the wall and floor that can be covered and hidden by the wall base member 1.

In one preferred embodiment, the pre-scored groove 7 preferably has flat sides 21 that converge. In the simplest form, the pre-scored groove 7 of this embodiment would have a V-shaped cross-section. In another preferred embodiment, the pre-scored groove 7 has curved sides 21 that converge. In the simplest form, the pre-scored groove 7 of this embodiment would have a semicircular or half-cylinder cross-section. In a slightly more complex form of this embodiment, the pre-scored groove 7 would have a U-shaped cross-section.

Although the wall base member 1 of the present invention can be formed by molding, the preferred method of forming a wall base member 1 is by extrusion. The method comprises the basic steps of extruding and simultaneously scoring the strip 2. An elongated, flexible strip 2 having a top edge 3 and a bottom edge 4, an inner face 5 and an outer face 6, is extruded along an extrusion vector 8. The top edge 3 and the bottom edge 4 are mutually substantially parallel and substantially parallel to the extrusion vector 8. Simultaneously, the strip 2 is scored to create a pre-scored groove 7 in the inner face 5 running between and substantially perpendicular to the top edge 3 and the bottom edge 4.

The pre-scored groove 7 preferably contacts no more than one of the top edge 3 and the bottom edge 4. Most preferably, the pre-scored groove 7 contacts neither the top edge 3 nor the bottom edge 4. Preferably, the inner face 5 is formed with a plurality of elongated raised ribs 16 that are between and substantially parallel to the top edge 3 and the bottom edge 4. These ribs 16 are preferably less than a millimeter in height and width and run the full length of the strip 2. Their primary purpose is to increase the surface area to which adhesives can bond, thereby increasing the strength of the attachment of the strip 2. The bottom edge 4 is preferably coved to create a toe 20 so that the outer face 6 projects along the bottom edge 4. The toe 2 increases the size of the gap between the wall and floor that can be covered and hidden by the wall base member 1.

Preferably, the pre-scored groove 7 is machined into the inner face 5. The pre-scored groove 7 is preferably machined with a router 18. Alternatively, the pre-scored groove 7 can be machined with an endmill 19. Preferably, the wall base member 1 is formed primarily from a thermoplastic material, preferably polyvinylchloride or PVC. Alternatively, the wall base member 1 can be formed primarily from a thermoset material, preferably rubber. Other materials or composites of other materials may prove suitable.

An alternative method of forming the wall base member 1 of the present invention comprises the steps of molding an elongated, flexible strip 2 having a top edge 3 and a bottom edge 4, an inner face 5 and an outer face 6, and a pre-scored groove 7 in the inner face 5. The top edge 3 and the bottom edge 4 are mutually substantially parallel. The pre-scored groove 7 runs between and substantially perpendicular to the top edge 3 and the bottom edge 4.

Again, the pre-scored groove 7 preferably contacts no more than one of the top edge 3 and the bottom edge 4. Most preferably, the pre-scored groove 7 contacts neither the top edge 3 nor the bottom edge 4. Preferably, the inner face 5 is formed with a plurality of elongated raised ribs 16 that are between and substantially parallel to the top edge 3 and the bottom edge 4. These ribs 16 are preferably less than a millimeter in height and width and run the full length of the strip 2. Their primary purpose is to increase the surface area to which adhesives can bond, thereby increasing the strength of the attachment of the strip 2. The bottom edge 4 is preferably coved to create a toe 20 so that the outer face 6 projects along the bottom edge 4. The toe 2 increases the size of the gap between the wall and floor that can be covered and hidden by the wall base member 1. Preferably, the molded wall base member 1 is formed primarily from a thermoset material. Other materials or composites of other materials may prove suitable.

Another alternative method of forming the wall base member 1 of the present invention comprises the steps of molding 8 an elongated, flexible strip 2 having a top edge 3 and a bottom edge 4, an inner face 5 and an outer face 6, and scoring the strip 2 to create a pre-scored groove 7 in the inner face 5. The top edge 3 and the bottom edge 4 are mutually substantially parallel. The pre-scored groove runs between and substantially perpendicular to the top edge 3 and the bottom edge 4.

Once again, the pre-scored groove 7 preferably contacts no more than one of the top edge 3 and the bottom edge 4. Most preferably, the pre-scored groove 7 contacts neither the top edge 3 nor the bottom edge 4. Preferably, the inner face 5 is formed with a plurality of elongated raised ribs 16 that are between and substantially parallel to the top edge 3 and the bottom edge 4. These ribs 16 are preferably less than a millimeter in height and width and run the full length of the strip 2. Their primary purpose is to increase the surface area to which adhesives can bond, thereby increasing the strength of the attachment of the strip 2. The bottom edge 4 is preferably coved to create a toe 20 so that the outer face 6 projects along the bottom edge 4. The toe 2 increases the size of the gap between the wall and floor that can be covered and hidden by the wall base member 1.

In this form of the molded wall base member 1, the pre-scored groove 7 is preferably machined into the inner face 5. The pre-scored groove 7 is preferably machined with a router 18. Alternatively, the pre-scored groove 7 can be machined with an endmill 19. Preferably, the wall base member 1 is formed primarily from a thermoset material. Other materials or composites of other materials may prove suitable.

The basic method of installing a first wall base member 1 according to the present invention comprises the steps of selecting the wall base member 1, selecting a portion of a wall 9 adjacent a portion of a floor 10, where the wall 9 and the floor 10 form a juncture 11, orienting the wall base member 1 so that the bottom edge 4 is oriented toward to the floor 10, the top edge 3 is oriented away from the floor 10, and both the bottom edge 4 and the top edge 3 are substantially parallel to the juncture 11, and adhering the wall base member 1 to the wall 9 so that at least a portion of the bottom edge 4 is in contact with the floor 10.

Preferably, the wall base member 1 is adhered to the wall 9 with an adhesive 12. The adhesive 12 preferably flows into the pre-scored groove 7. Preferably, the wall base member 1 is flat against the wall 9.

If the wall 9 includes a corner 13 having a substantially vertical elongated edge 14 that projects between two flat portions 24 of the wall 9, the first wall base member 1 is horizontally aligned so that the pre-scored groove 7 interfaces with the edge 14 and the wall base member 1 is bent at the groove 7 defining an angle 22 of less than 180 degrees between portions of the inner face 5 on either side of the groove 7.

In this case the method of installation preferably further comprises the following steps. Selecting a second wall base member 1 identical to the first wall base member 1. Selecting a portion of a wall 9 adjacent the first wall base member 1 and adjacent a portion of a floor 10, where the wall 9 and the floor 10 form a juncture 11. Orienting the second wall base member 1 so that the bottom edge 4 is oriented toward to the floor 10, the top edge 3 is oriented away from the floor 10, both the bottom edge 4 and the top edge 3 are substantially parallel to the juncture 11, and the second wall base member 1 contacts the first wall base member 1. Adhering the second wall base member 1 to only one of the portions 24 of the wall 9 so that at least a portion of the bottom edge 4 is in contact with the floor 10 and the inner face 5 of the second wall base member 1 is flat against the wall 9.

If the wall 9 includes a corner 13 having a substantially vertical elongated junction 15 between two flat portions 24 of the wall 9, the first wall base member 1 is horizontally aligned so that the pre-scored groove 7 interfaces with the junction 15 and the wall base member 1 is bent at the groove 7 defining an angle 22 of more than 180 degrees between portions of the inner face 5 on either side of the groove 7.

In this case the method of installation preferably further comprises the following steps. Selecting a second wall base member 1 that is identical to the first wall base member 1. Selecting a portion of a wall 9 adjacent the first wall base member 1 and adjacent a portion of a floor 10, where the wall 9 and the floor 10 form a juncture 11. Orienting the second wall base member 1 so that the bottom edge 4 is oriented toward to the floor 10, the top edge 3 is oriented away from the floor 10, both the bottom edge 4 and the top edge 3 are substantially parallel to the juncture 11, and the second wall base member 1 contacts the first wall base member 1. Adhering the second wall base member 1 to only one of the portions 24 of the wall 9 so that at least a portion of the bottom edge 4 is in contact with the floor 10 and the inner face 5 of the second wall base member 1 is flat against the wall 9.

Typically, the angle 22 is substantially equal to 270 degrees when the angle 22 is more than 180 degrees between portions of the inner face 5 on either side of the groove 7. Preferably, a 90-degree section 23 of the wall base member 1 is cut out at the junction 15 to facilitate bending when the angle 22 is substantially equal to 270 degrees. The bottom edge 4 is preferably coved to create a toe 20 so that the outer face 6 projects along the bottom edge 4 and the 90-degree section 23 is preferably cut out of the toe 20.

The inner face 5 is preferably formed with a plurality of elongated raised ribs 16 that are between and substantially parallel to the top edge 3 and the bottom edge 4, and the adhesive 12 bonds to and between the ribs 16. Preferably, the bottom edge 4 is turned outward so that the outer face 6 projects along the bottom edge 4, covering a gap 17 at the juncture 11. The adhesive 12 is preferably an acrylic adhesive. Preferably, the adhesive 12 is applied to the wall 9. The adhesive 12 is preferably applied to the inner face 5.

The wall base member 1 is preferably manufactured in four different heights: 2.5, 4.0, 6.0 and 10.0 inches, respectively. The preferred length of each elongated, flexible strip 2 is 4 feet. The wall base member 1 is also preferably manufactured and sold in one-piece rolls of 100 or 120 feet. Preferably, each 4-foot strip 2 has one pre-scored groove 7, each roll of 100 feet has 25 pre-scored grooves 7, and each roll of 120 feet has 30 pre-scored grooves 7. The preferred depth of each pre-scored groove 7 is 0.035 inches with a tolerance of plus or minus 0.005 inches. The standard thicknesses for wall base member 1 are 0.080 and 0.125 inches. The toe 20 preferably has a compound curve. If the wall base member 1 is manufactured from thermoplastic vinyl or thermoplastic rubber, the larger upper radius of the compound curve is preferably 0.310 inches and the smaller lower radius is preferably 0.094 inches. If the wall base member 1 is manufactured from thermoset rubber, the larger upper radius of the compound curve is preferably 0.246 inches and the smaller lower radius is preferably 0.215 inches. If the wall base member 1 is manufactured from thermoplastic vinyl or thermoplastic rubber, the toe 20 is 0.500 inches in height and 0.500 inches in depth. If the wall base member 1 is manufactured from thermoset rubber, the toe 20 is 0.287 inches in height and 0.552 inches in depth. The wall base member 1 preferably tapers toward the top edge 3; the taper is preferably curved. If the wall base member 1 is manufactured from thermoplastic vinyl or thermoplastic rubber, the curve preferably has a radius of 0.094 inches. If the wall base member 1 is manufactured from thermoset rubber, the curve preferably has a radius of 0.246 inches. If the wall base member 1 is manufactured from thermoplastic vinyl or thermoplastic rubber, the area adjacent the top edge preferably tapers from 0.080 or 0.125 inches to 0.020 inches and the height of the tapered area adjacent the top edge is preferably 0.051 inches. If the wall base member 1 is manufactured from thermoset rubber, the area adjacent the top edge 3 preferably tapers from 0.080 or 0.125 inches to 0.061 inches and the height of the tapered area adjacent the top edge is preferably 0.045 inches. If the wall base member 1 is made from thermoplastic material, it preferably has 10 to 12 longitudinal ribs 16 per inch of height, the ribs 16 having a height of 0.005 to 0.007 inches. The wall base member 1 preferably has a pair of longitudinal grooves 26 with a nominal depth of 0.005 inches and a width of 0.094 inches. The preferred thermoplastic materials are flexible thermoplastic poly vinyl chloride and flexible thermoplastic rubber. The preferred thermoset material is flexible thermoset rubber.

We claim:

1. A wall base member (1) applied to a wall (9) having at least one flat portion (24), said wall base member (1) comprising:
    a. an elongated, flexible strip (2) having a top edge (3) and a bottom edge (4), an inner face (5) and an outer face (6), and a plurality of pre-scored grooves (7) in said inner face (5) running between and substantially perpendicular to said top edge (3) and said bottom edge (4), said top edge (3) and said bottom edge (4) being substantially parallel; and
    b. at least one of said pre-scored grooves (7) is applied adjacent said flat portion (24) of said wall (9);
    c. at least one of said pre-scored grooves (7) is closed adjacent at least one of said top edge (3) and said bottom edge (4) so that said pre-scored groove (7) is not a channel through said elongated, flexible strip (2), and said pre-scored groove does not open in said outer face (6) of said elongated, flexible strip; and
    d. said wall (9) includes a corner (13) having a substantially vertical elongated edge (14) that projects between two flat portions (24) of said wall (9); and
    e. said first wall base member (1) is horizontally aligned so that one of said pre-scored grooves (7) interfaces with said edge (14) and said wall base member (1) is bent at said groove (7) defining a right angle (22) between portions of said inner face (5) on either side of said groove (7), said pre-scored groove (7) having convergent sides (21) that meet when applied adjacent said edge (14).

2. The wall base member (1) of claim 1, wherein:
    a. said pre-scored grooves (7) contact no more than one of said top edge (3) and said bottom edge (4).

3. The wall base member (1) of claim 2 wherein:
    a. said pre-scored grooves (7) contact neither of said top edge (3) and said bottom edge (4).

4. The wall base member (1) of claim 1 wherein:
    a. said inner face (5) is formed with a plurality of elongated raised ribs (16) that are between and substantially parallel to said top edge (3) and said bottom edge (4).

5. The wall base member (1) of claim 1 wherein:
    a. said bottom edge (4) is turned outward so that said outer face (6) projects along said bottom edge (4);
    b. said pre-scored grooves (7) terminate just before reaching said top edge (3) and terminate where said wall base member (1) begins to turn outward.

6. The wall base member (1) of claim 1 wherein:
    a. said pre-scored grooves (7) have flat sides (21) that converge.

7. The wall base member (1) of claim 1 wherein:
    a. said pre-scored grooves (7) have curved sides (21) that converge.

* * * * *